United States Patent [19]
Broome et al.

[11] Patent Number: 6,074,474
[45] Date of Patent: Jun. 13, 2000

[54] MULTI-COMPONENT PIGMENT SLURRY AND METHOD OF MAKING THE SAME

[75] Inventors: Thad T. Broome; Mark E. Wozniak, both of Macon; James Ray Lamb, Danville, all of Ga.

[73] Assignee: J.M. Huber Corporation, Edison, N.J.

[21] Appl. No.: 09/062,353

[22] Filed: Apr. 17, 1998

[51] Int. Cl.⁷ .............................. C09D 1/00; C09D 1/02; C09D 1/04
[52] U.S. Cl. .................. 106/486; 106/401; 106/461; 106/464; 106/465; 106/466; 106/467; 106/468; 106/469; 106/471; 106/482; 106/483; 106/487
[58] Field of Search ....................... 106/416, 401, 106/464, 465, 466, 467, 468, 469, 461, 482, 483, 486, 487, 471

[56] References Cited

U.S. PATENT DOCUMENTS

| | | | |
|---|---|---|---|
| 4,017,324 | 4/1977 | Eggers | 106/486 |
| 4,241,142 | 12/1980 | Kaliski et al. | 106/416 |
| 4,888,315 | 12/1989 | Bowman et al. | 106/486 |
| 5,112,402 | 5/1992 | Freeman et al. | |
| 5,120,365 | 6/1992 | Kogler . | |
| 5,171,631 | 12/1992 | Adkins . | |
| 5,320,672 | 6/1994 | Whalen-Shaw . | |
| 5,478,388 | 12/1995 | Gane et al. | 106/464 |
| 5,486,233 | 1/1996 | Mitchell et al. | 106/416 |
| 5,605,568 | 2/1997 | Naydowski et al. | 106/464 |
| 5,846,309 | 12/1998 | Freeman et al. | 106/486 |
| 5,882,396 | 3/1999 | Hiorns | 106/464 |

FOREIGN PATENT DOCUMENTS

| | | |
|---|---|---|
| 01174697 | 7/1989 | Japan . |
| 06305237 | 11/1994 | Japan . |

*Primary Examiner*—Michael Marcheschi
*Attorney, Agent, or Firm*—Kenyon & Kenyon

[57] ABSTRACT

A multi-component pigment slurry which comprises at least 50% solids. The slurry is formulated to be admixed into paint and coating compositions to promote $TiO_2$ extension. The slurry includes a structured pigment, a coarse particle size pigment, and a fine particle size pigment. The structured pigment comprises about 20% to about 55% of the slurry by dry weight and has a median particle size diameter of about $0.7\mu$ to about $6.0\mu$. The coarse particle size pigment preferably comprises about 20% to about 60% by weight of the slurry and has a median particle size diameter of about $3.0\mu$ to about $10.0\mu$. The fine particle size pigment preferably comprises up to about 50% by dry weight of the slurry and has a median particle size diameter of about $0.2\mu$ to about $1.0\mu$.

16 Claims, 4 Drawing Sheets

MULTI-COMPONENT PIGMENT SLURRY AND METHOD OF MAKING THE SAME

TECHNICAL FIELD

This invention relates to a multi-component pigment slurry and, more particularly, to such a slurry which includes a structured pigment, a coarse particle size pigment and a fine particle size pigment. The invention also relates to a method of making such a multi-component pigment slurry.

BACKGROUND OF THE INVENTION

Pigments are important components in paint and coating compositions as they provide the requisite degree of opacity and affect other coating properties such as $TiO_2$ augmentation, sheen, gloss, scrubability, stain removal and tinting strength. The level of opacity, or hiding power, is a critical performance property of most coatings. Opacity can be generally defined as the degree to which a material obscures a substrate. Some key factors affecting opacity are: (1) the difference in the refractive index between the pigment and the medium; (2) the spacing of the pigment particles; (3) the size of the pigment particles, and (4) the introduction of air microvoids in the coating through the use of structured pigments. To achieve opacity, there must be a significant difference in the refractive index between the pigment and the medium used.

The most effective opacifying, white pigment used today is titanium dioxide ($TiO_2$). $TiO_2$ yields the greatest difference in the refractive index between any pigment and commonly used coating mediums. $TiO_2$ extension has been a desired goal in the coatings industry for some time for the several reasons: (1) $TiO_2$ is the largest line item in a coating producer's raw material budget; (2) coating producers are constantly looking for ways to reduce costs; (3) $TiO_2$ has a relatively high unit price, and (4) there exists a possibility of a shortage of $TiO_2$.

It is generally known that $TiO_2$ extension can be achieved through the use of: ultra-fine particle size pigments, preferably having a particle size in the range of about $0.2\mu$ to about $0.3\mu$; structured pigments which contain air voids, and a combination of ultra-fine particle size pigments and structured pigments as previously described in U.S. Pat. No. 5,112,402. The first strategy involves spacing the individual titanium dioxide particles in order to obtain optimal use of the remaining $TiO_2$ which is added to the coating. It has been determined that for optimum efficiency of $TiO_2$, there should be a $0.2\mu$ to a $0.3\mu$ space between the $TiO_2$ particles. The second strategy utilizes high oil absorption, structured pigments to introduce air voids in the dried coating film. The air voids, like $TiO_2$, produce boundary areas of differing refractive indexes which refract light and thereby provide additional dry hiding. The pigments which promote titanium dioxide extension are known as $TiO_2$ extenders.

Structured pigments used as titanium dioxide extenders are typically available only in dry form. Such extenders include flash calcined clays (e.g. OPTIWHITE calcined clay available from Burgess Pigment of Sandersville, Ga.), standard calcined clays (e.g. HUBER 70C calcined clay available from J. M. Huber Corp., Edison, N.J.), and amorphous silicates (e.g. ZEOLEX 80 Amorphous Silicate available from J. M. Huber Corp.). Utilizing these dry form extenders in a paint (or other coating) formulation presents several problems. Coating manufacturers, who purchase the dry form extenders, must make a dispersion of the pigments (i.e. extenders) at their respective plants. A substantial amount of dust is created when the bags, which contain the pigments, are opened in order to be made into a dispersion. Further, the storage of the bags of pigments require significant amounts of space. Other drawbacks include poor batch to batch consistency and increased machine wear resulting from the grinding and milling steps required to make the paint.

In recognition of the foregoing, a unique slurry system was developed and is disclosed in U.S. Pat. No. 5,112,402. From the coatings manufacturer's point of view, there are several advantages for purchasing a pigment slurry as opposed to purchasing the pigments in dry form. Some of the advantages include: reduction of dust and bag disposal, reduction of storage space requirements, improved production speed (since no grinding or milling is required), minimization of dispersion, reduction of machine wear and repair costs, improvements in consistency and coating properties, and the ability to readily make corrections to finished formulations.

However, the slurry disclosed in the '402 patent does not have the sheen control required by certain coating compositions such as flat latex paint formulations. Further, such slurry has a relatively high binder demand and does not have the requisite solids percentage for certain coating formulations.

SUMMARY OF THE INVENTION

The present invention is designed to overcome the deficiencies of the prior art discussed above. In accordance with the illustrative embodiments and demonstrating features of the present invention, there is provided a multi-component pigment slurry which comprises at least 50% solids. The slurry is formulated to be admixed into coating compositions to promote $TiO_2$ extension and to provide the requisite coating properties in terms of sheen, gloss, scrubability, stain removal and tinting strength. The pigment slurry includes a structured pigment, a coarse particle size pigment, and a fine particle size pigment. The structured pigment comprises about 20% to about 55% of the slurry solids by weight and has a median particle size diameter of about $0.7\mu$ to about $6.0\mu$. The coarse particle size pigment comprises about 15% to about 60% by weight of the slurry solids and has a median particle size diameter of about $3.0\mu$ to about $10.0\mu$. The fine particle size pigment comprises about 0.0% to about 50% by weight of the slurry solids and has a median particle size diameter of about $0.2\mu$ to about $1.0\mu$. This invention also relates to a method of making such a multi-component pigment slurry having high solids, good stability, and pumpable rheology.

Other objects, features, and advantages will be readily apparent from the following detailed description of preferred embodiments thereof taken in conjunction with the drawings.

DETAILED DESCRIPTION OF PREFERRED EMBODIMENTS

In accordance with the preceding summary, the present invention is directed toward multi-component pigment slurries which are added to aqueous coating compositions to promote $TiO_2$ extension and to provide requisite levels of sheen, gloss, scrubability, stain removal and tinting strength. The coating compositions may have any of a variety of resin and vehicle components as are well known in the art. Although specific coating formulations are disclosed in examples set forth below, it will be apparent that other coating formulations according to the present invention may be prepared which include the multi-component pigment slurry disclosed herein. In a preferred method of use, the pigment slurry is added to a flat latex paint formulation.

The multi-component pigment slurry includes a structured pigment, a coarse particle size pigment, and a fine particle size pigment. Each of the pigments are combined into a unique, pigment slurry system which comprises at least 50% solids and, preferably, more than 55% solids.

Structured pigments are inorganic, mineral or synthetic based pigments which are characterized as having a high internal porosity with an oil absorption which is typically greater than 40 g/100 g. Such pigments are effective in promoting $TiO_2$ extension as they create air voids in the coating composition. The voids, like $TiO_2$, refract light thereby providing additional dry hiding. The preferred structured pigment, in the multi-pigment slurry disclosed herein, has a median particle size diameter of about $0.7\mu$ to about $6.0\mu$ and comprises about 20% to about 55% of the slurry solids by weight. The structured pigment is preferably selected from the group consisting of metal alumino-silicate, synthetic alkali metal alumino-silicate, calcined clay, precipitated calcium carbonate, and silica. However, other similarly structured, high oil absorption pigments can be utilized.

Figure 1:
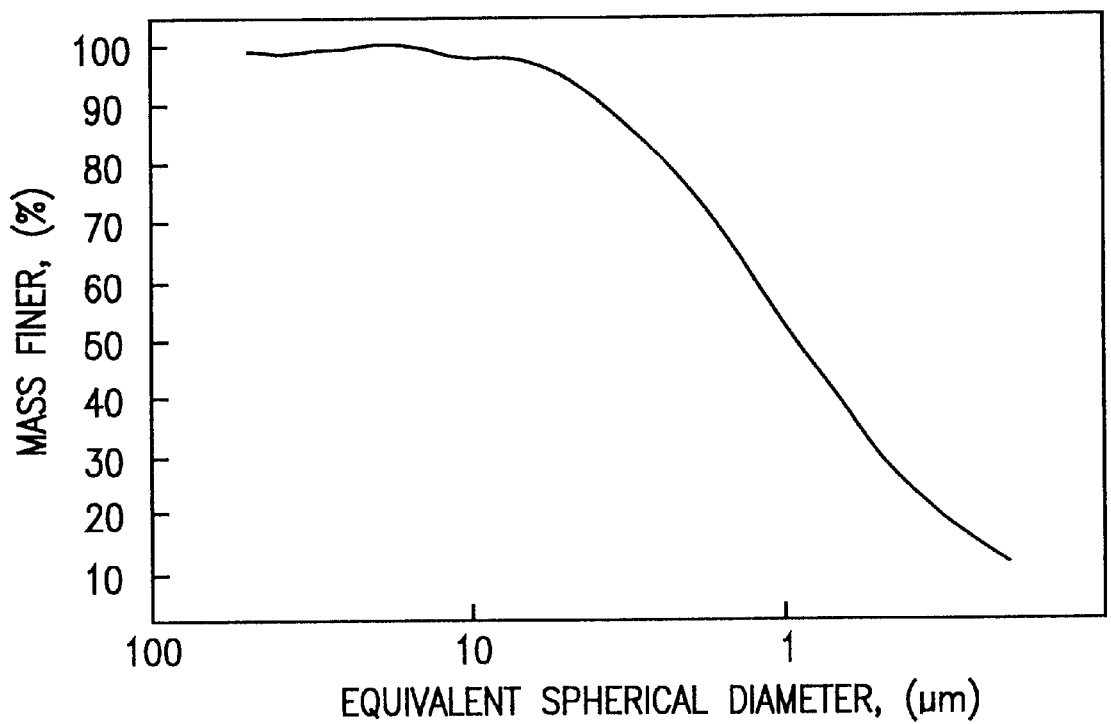
FIG. 1 is a graphical representation showing the particle size distribution curve of a typical structured pigment component of the multi-component pigment slurry.

FIG. 1 shows the X-ray sedimentation particle size distribution curve, which was obtained through the use of a Sedigraph 5100 particle size unit, of a preferred synthetic, structured pigment sold under the trademark Huber 683™ by J. M. Huber Corp. HUBER 683 is a precipitated sodium alumino-silicate. As shown in FIG. 1, HUBER 683 precipitated sodium alumino-silicate has a median particle size diameter (i.e., average Stokes equivalent particle size diameter) of about $0.91\mu$.

The preferred coarse particle size pigment has a median particle size diameter of about $3.0\mu$ to about $10.0\mu$ and comprises about 15% to about 60% of the slurry solids by weight. The coarse particle size pigment is preferably selected from the group consisting of clay, ground calcium carbonate, barite, aluminum trihydrate, talc, silica, diatomaceous earth, and nepheline syenite. The addition of the coarse particle size pigment into certain coating formulations such as flat latex paints, has been found to improve the sheen control to acceptable levels. The coarse particle size pigment also lowers binder demand and improves the solids of the slurry and the final coating formulations.

Figure 2:
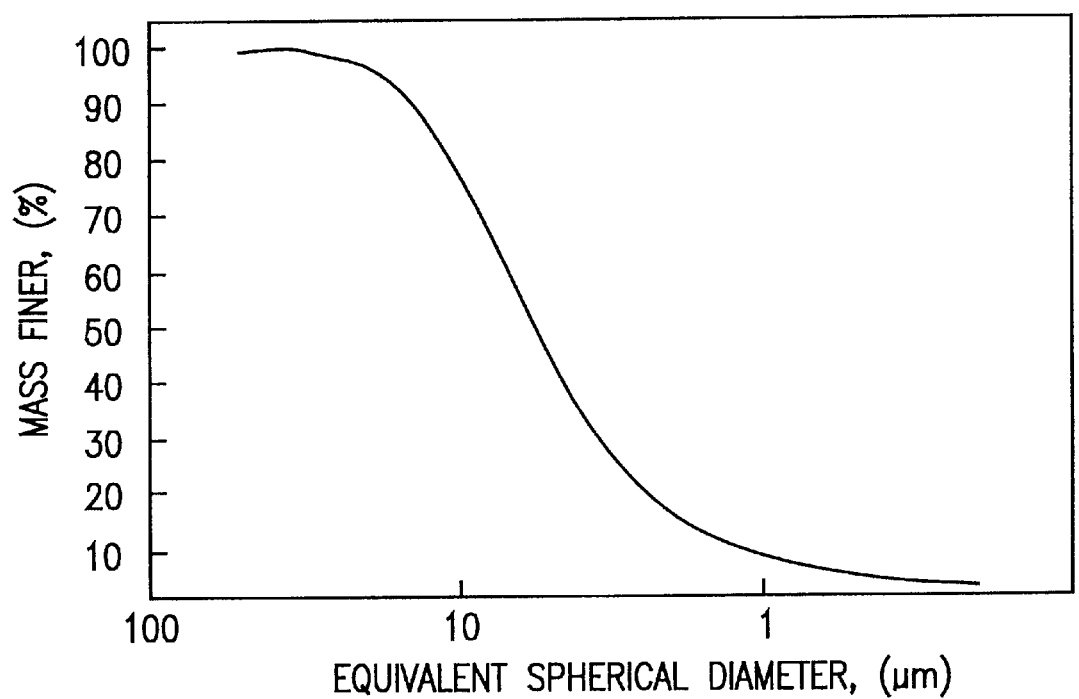
FIG. 2 is a graphical representation showing the particle size distribution curve of a typical coarse particle size component of the multi-component pigment slurry.

FIG. 2 shows a particle size distribution curve of a coarse particle size ground calcium carbonate ($CaCO_3$) utilized in a preferred pigment slurry described below. The median particle size diameter of the coarse $CaCO_3$ shown in FIG. 2 is $5.65\mu$ and is sold under the trademark HUBERCARB Q6 calcium carbonate by J. M. Huber Corp.

In the preferred embodiment, the fine particle size pigment comprises about 0.0% to about 50% of the slurry solids by weight and has a median particle size diameter of about $0.2\mu$ to about $1.0\mu$. The fine particle size pigment is preferably selected from the group consisting of clay, calcium carbonate, precipitated silica, and barite.

Figure 3:
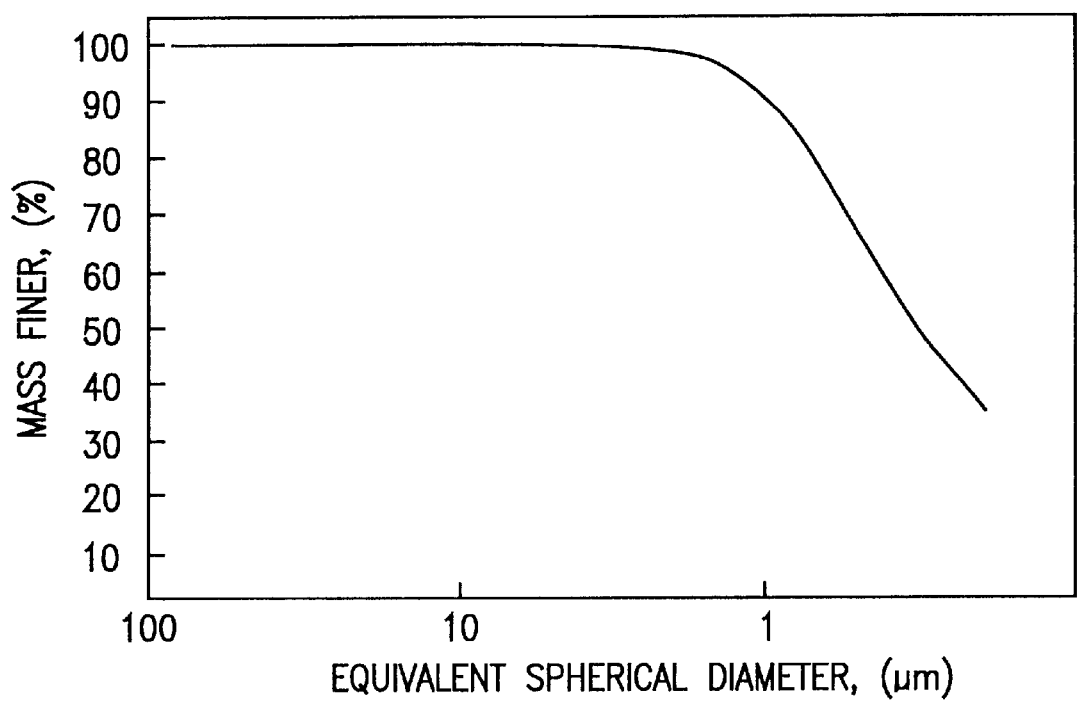
FIG. 3 is a graphical representation showing the particle size distribution curve of a typical fine particle size component of the multi-component pigment slurry.

FIG. 3 shows a particle size distribution curve of a fine particle size ground $CaCO_3$ utilized in a preferred pigment slurry described below. This fine particle size pigment has a median particle size diameter of $0.34\mu$ and is available from Omya SA of Paris, France under the trademark HYDROCARB HG.

The addition of the fine particle size pigment into the multi-component slurry product provides additional $TiO_2$ extension in paint and coating formulations by separating the individual titanium dioxide pigment particles which are added to the coating. It has been determined that for optimum efficiency of $TiO_2$, there should be a $0.2\mu$ to a $0.3\mu$ space between the $TiO_2$ particles.

A high solids, stable pigment slurry is obtained by mixing specific amounts of the three pigments described above with water and dispersing chemicals. The resultant mixture yields slurries having from 55–70% total solids. The dry weight ratios of the pigments have been optimized to provide a single pigment package which has been shown to significantly simplify the formulating of various coating compositions. Use of the proposed invention simplifies the addition of pigments into coating formulations since the slurry is treated as if it were a single pigment. The slurry has been shown to be particularly desirable in the formulation of flat, eggshell, and satin interior latex finishes.

EXAMPLE 1

Figure 4:
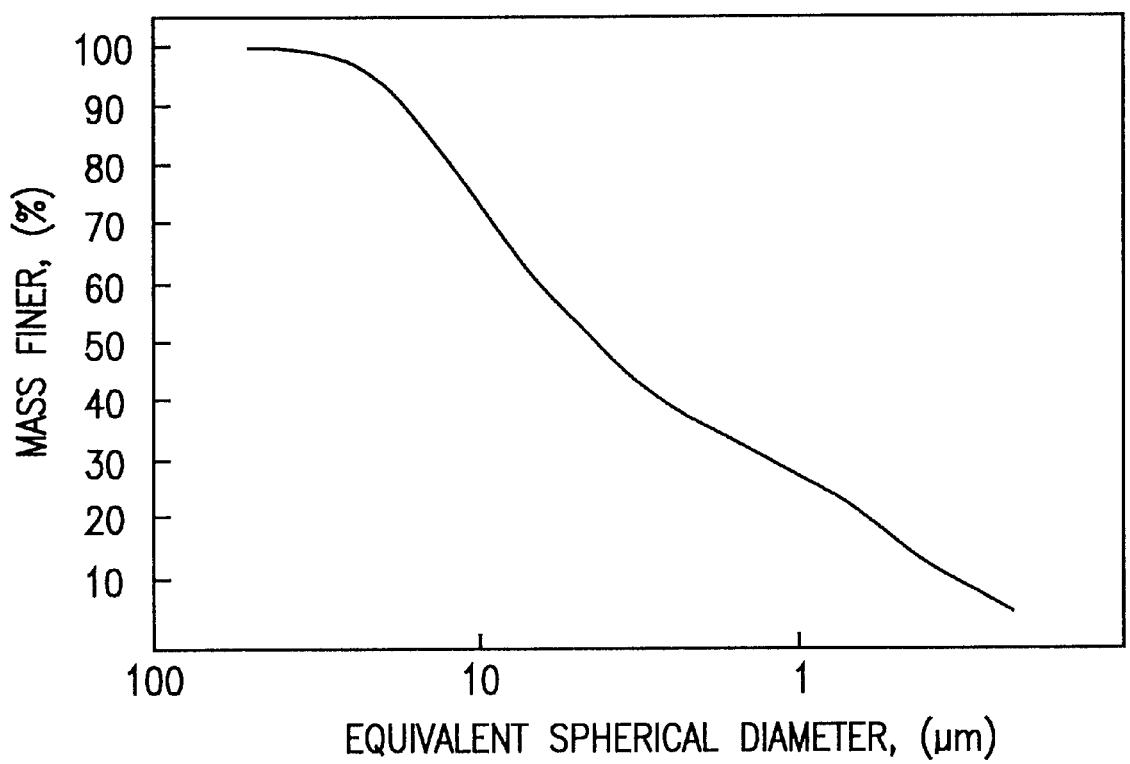
FIG. 4 is a graphical representation showing the particle size distribution curve of a sample of a multi-component pigment slurry formed in accordance with the invention.

A preferred pigment slurry comprises 30% (by dry weight) of HUBER 683 structured pigment, 50% (by dry weight) of Hubercarb Q6™ coarse particle size pigment, and 20% (by dry weight) of HYDROCARB HG fine particle size pigment. FIG. 4 shows a particle size distribution curve of the preferred slurry. As shown in FIG. 4, the slurry has a median particle size diameter of 3.93μ.

A preferred procedure for making down the slurry will now be described. Approximately a quart sample of the multi-component slurry is obtained by combining about 380 grams of de-ionized water and 0.10% dispersant COLLOID 244 or COLLOID 280 defoamer as based on the weight % of active dispersant on dry pigment. About 215 grams of HYDROCARB HG slurry (as received at 74.42% solids) is added under agitation. About 240 grams of HUBER 683 precipitated sodium alumino-silicate is then added to the above mixture under agitation followed by 400 grams of HYDROCARB Q6 pigment. The above mixture tends to be extremely thick and moderate shearing is required to sufficiently disperse the pigments. The target low shear Brookfield viscosity (at 20 rpm) is approximately 75–200 cps. Additional dispersant is then added to the slurry until it is just past the minimum low shear viscosity. An associative thickener (e.g., ACRYSOL, TT-615 thickner is then added to raise the low shear viscosity to help inhibit pigment settling. The target low shear Brookfield viscosity of this thickened slurry is 750–1500 cps.

Table 1 sets forth various physical properties of the slurry made be the process described above.

TABLE 1

Multi-Purpose Pigment Slurry

| Physical Property | Calculated Values |
|---|---|
| Solids, % | 59.5–61.5 |
| pH | 9.5–10.5 |
| TAPPI Pigment Brightness, % Reflectance | 89–90 |
| median particle size, micron (Sedigraph) | 3.93 |
| specific gravity, pigment | 2.49 |
| weight/gallon slurry, lbs. | 13.07 |
| B.E.T. Surface Area (sq. m/gm) | 17.23 |
| Oil Absorption (g/100 g clay) | 33–36 |
| crystalline silica (quartz), % | <0.10 |
| viscosity, cps | 750–1500 |

Table 2 sets forth the specific ingredients of an interior latex flat paint formulations which include the multi-component pigment slurry when compared to control formulations made with conventional dry extender pigments.

TABLE 2

Multi-Purpose Pigment Slurry Utilized in Interior Latex Paint Formulations

| | Sample 1* | Sample 2* | Sample 3* | Sample 4** (control) | Sample 5** (control) |
|---|---|---|---|---|---|
| Ingredients (lbs./100 gallons) | | | | | |
| Water | 172.83 | 162.44 | 152.06 | 341.79 | 341.79 |
| NATROSOL 250 MBR thickner | 5.00 | 5.00 | 5.00 | 5.00 | 5.00 |
| COLLOID 643 defoamer | 1.88 | 1.88 | 1.88 | 1.88 | 1.88 |
| TAMOL 850-30 dispersant | 3.72 | 3.72 | 3.72 | 3.72 | 3.72 |
| NUOSEPT qs preservative | 2.00 | 2.00 | 2.00 | 2.00 | 2.00 |
| Propylene Glycol | 21.60 | 21.60 | 21.60 | 21.60 | 21.60 |
| TEXANOL solvent | 7.90 | 7.90 | 7.90 | 7.90 | 7.90 |
| ZOPAQUE RCS-3 (TiO$_2$) | 310.08 | 232.56 | 155.04 | 232.56 | 232.56 |
| Multi-Component Pigment Slurry | 295.86 | 453.30 | 610.73 | | |
| OPTIWHITE CLAY | | | | 136.00 | |
| OPTIWHITE P CLAY | | | | | 136.00 |
| HUBERCARB Q8 calcium carbonate | | | | 131.16 | 131.16 |
| Added the ingredients below. Mixed at low speeds for 15 minutes. | | | | | |
| Water | 16.68 | 16.68 | 16.68 | 16.68 | 16.68 |
| NATROSOL MBR thickner | 3.00 | 3.00 | 3.00 | 3.00 | 3.00 |

TABLE 2-continued

Multi-Purpose Pigment Slurry Utilized in
Interior Latex Paint Formulations

|  | Sample 1* | Sample 2* | Sample 3* | Sample 4** (control) | Sample 5** (control) |
|---|---|---|---|---|---|
| ICEPAL CO-630 surfactant | 2.00 | 2.00 | 2.00 | 2.00 | 2.00 |
| COLLOID 643 defoamer | 1.00 | 1.00 | 1.00 | 1.00 | 1.00 |
| UCAR 379 resin | 268.44 | 214.95 | 161.45 | 214.54 | 214.54 |
| Total | 1111.99 | 1128.02 | 1144.06 | 1120.82 | 1120.82 |

*Mixed at slow speed for 10 minutes
**Dispersed at high speeds for 10 minutes.

Table 3 sets forth some physical properties of the paint formulation which contains the preferred multi-component slurry described above.

TABLE 3

Multi-Purpose Pigment Slurry Utilized in
Interior Latex Paint Formulations

|  | Sample 1 | Sample 2 | Sample 3 | Sample 4 (control) | Sample 5 (control) |
|---|---|---|---|---|---|
| Solids By Weight, % | 48.76 | 49.47 | 50.16 | 49.13 | 49.13 |
| Solids By Volume, % | 31.58 | 31.58 | 31.58 | 31.58 | 31.58 |
| P.V.C., % | 50.00 | 60.00 | 70.00 | 60.00 | 60.00 |
| Consistency, Krebs units | 115 | 116 | 118 | 107 | 111 |
| pH | 8.48 | 8.81 | 9.15 | 8.01 | 7.59 |
| Directional Reflectance, Y Value | 91.37 | 91.45 | 91.04 | 91.64 | 90.21 |
| Contrast Ratio | 0.975 | 0.981 | 0.981 | 0.982 | 0.987 |
| Sheen, 85 Degree | 3.8 | 3.2 | 3.1 | 3.2 | 3.1 |
| Gloss, 60 Degree | 3.2 | 3.2 | 3.2 | 3.2 | 3.2 |
| Porosity, Retained Reflectance, % | 93.2 | 82.7 | 68.7 | 79.4 | 77.8 |
| Relative Tint Strength, % | 0.0 | 1.8 | −0.6 | −1.2 | 8.8 |
| Tinted Y Value, % | 50.35 | 50.66 | 50.31 | 50.15 | 51.78 |
| Scrub Resistance Washability |  |  |  |  |  |
| Pencil(#2) | 579 | 240 | 114 | 261 | 217 |
| Crayon(Brn) | 61 | 48 | 41 | 80 | 98 |
| | 42 | 34 | 31 | 40 | 41 |
| Heat Stability, 14 days, 120 deg. oven |  |  |  |  |  |
| 60 degree gloss (before oven) | 3.2 | 3.2 | 3.2 | 3.2 | 3.2 |
| 60 degree gloss (after oven) | 3.2 | 3.2 | 3.2 | 3.2 | 3.2 |
| 85 degree sheen (before oven) | 3.9 | 3.3 | 3.2 | 3.3 | 3.2 |
| 85 degree sheen (after oven) | 4.0 | 3.4 | 3.3 | 3.3 | 3.2 |
| consistency, krebs units (before oven) | 116 | 115 | 118 | 108 | 111 |
| consistency, krebs units | 116 | 115 | 120 | 105 | 113 |

TABLE 3-continued

Multi-Purpose Pigment Slurry Utilized in
Interior Latex Paint Formulations

|  | Sample 1 | Sample 2 | Sample 3 | Sample 4 (control) | Sample 5 (control) |
|---|---|---|---|---|---|
| (after oven) shelf stability, krebs units | 115 | 116 | 118 | 107 | 111 |
| shelf stability, krebs units (after 7 mos.) | 115 | 117 | 118 | 107 | 112 |

As can be seen in Table 3, the use of the multi-component pigment slurry in paint formulations results yields the required performance values in the areas of directional reflectance, porosity, relative tint strength, scrub resistance, sheen control and shelf stability as compared to the formulations containing conventional dry extender pigments.

EXAMPLE 2

Another preferred slurry comprises 40% (by dry weight) of Huber 683 structured pigment, 40% (by dry weight) of HUBERCARB Q6 coarse particle size pigment, and 20% (by dry weight) of HYDROCARB HG fine particle size pigment. This slurry has shown better performance in certain coating formulations which contain enamel grade titanium dioxide.

While three component slurry systems have been described above, it should be noted that other pigments such as an additional, coarser pigment can be added to the slurry to increase the flattening capabilities of the same. The coarser pigment preferably has a median particle size diameter of about $8.0\mu$ to about $15.0\mu$ and is preferably either a diatomaceous earth or a synthetic inorganic pigment. The addition of a coarser particle size pigment at levels of up to 25% by weight of the total pigment solids in the multi-component pigment slurry is particularly useful in paint formulations requiring increased flattening characteristics. Example 3 discloses such a four component pigment slurry.

EXAMPLE 3

A preferred four component pigment slurry comprises 30% (by dry weight) of the HUBER 683 structured pigment, 40% (by dry weight) of HUBERCARB Q6 coarse particle size pigment, 20% (by dry weight) of HYDROCARB HG fine particle size pigment, and 10% (by dry weight) of a low-crystalline silica extender pigment sold under the name DIAFIL 525. Paint formulations which include such a four component slurry system have lower sheen values than paint formulations which contain one of the three component slurry systems described above. In a conventional interior, latex flat formulation of 45% P.V.C., the four component pigment slurry was observed to provide a 30–35% reduction in 85° sheen values, as compared to the paints using three component slurry products, while simultaneously maintaining other critical paint properties such as directional reflectance, contrast ratio, tinting strength, porosity and scrubability.

The present invention may be embodied in other specific forms without departing from the spirit or essential attributes thereof and accordingly reference should be made to the appended claims rather than to the foregoing specification as indicating the scope of the invention.

What is claimed is:

1. A multi-component pigment slurry including at least 50% solids, said multi-component pigment slurry comprising:

a structured pigment in the amount of about 20% to about 55% by dry weight, said structured pigment having a median particle size diameter of $0.7\mu$ to $6.0\mu$;

a coarse particle size pigment in the amount of about 15% to about 60% by dry weight, said coarse particle size pigment having a median particle size diameter of $3.0\mu$ to $10.0\mu$, and a fine particle size pigment in the amount of greater than zero up to 50% by weight, said fine particle size pigment having a median particle size diameter of $0.2\mu$ to $1.0\mu$.

2. The slurry of claim 1 wherein said structured pigment is selected from the group consisting of metal alumino-silicate, synthetic alkali metal alumino-silicate, calcined clay, calcium carbonate, and silica.

3. The slurry of claim 1 wherein said coarse particle size pigment is selected from the group consisting of clay, calcium carbonate, barite, aluminum trihydrate, talc, silica, diatomaceous earth, and nepheline syenite.

4. The slurry of claim 1 wherein said fine particle size pigment is selected from the group consisting of clay, calcium carbonate, precipitated silica, and barite.

5. The slurry of claim 1 further including a coarser particle size pigment in the amount of up to about 25.0%, said coarser particle size pigment having a median particle size diameter of $8.0\mu$ to $20.0\mu$.

6. The slurry of claim 5 wherein said coarser pigment is selected from the group consisting of diatomaceous earth and a synthetic inorganic pigment.

7. The slurry of claim 1 wherein said slurry is used as a component of a water based paint formulation.

8. A multi-component pigment slurry for use in a paint formulation including at least 50% solids, said multi-component pigment slurry comprising:

a structured pigment in the amount of about 30% to about 40% by dry weight, said structured pigment having a median particle size diameter of $0.7\mu$ to $1.0\mu$;

a coarse particle size pigment in the amount of about 40% to about 60% by dry weight, said coarse particle size pigment having a median particle size diameter of $4.0\mu$ to $7.0\mu$, and a fine particle size pigment in the amount of about 15.0% to about 25.0% by dry weight, said fine particle size pigment having a median particle size diameter of $0.2\mu$ to $0.5\mu$.

9. The slurry of claim 8 wherein said structured pigment is selected from the group consisting of metal alumino-silicate, synthetic alkali metal alumino-silicate, and calcined clay.

10. The slurry of claim 8 wherein said coarse particle size pigment is selected from the group consisting of clay, calcium carbonate, and barite.

11. The slurry of claim 8 wherein said fine particle size pigment is calcium carbonate.

12. A method of making a multi-component pigment slurry consisting of at least 50% solids comprising the steps of:

providing water;

admixing a structured pigment under agitation, said structured pigment having a median particle size diameter of $0.7\mu$ to $6.0\mu$;

admixing a fine particle size pigment under agitation, said fine particle size pigment having a median particle size diameter of $0.2\mu$ to $1.0\mu$, and admixing of a coarse particle size pigment under agitation, said coarse particle size pigment having a median particle size diameter of $3.0\mu$ to $10.0\mu$.

13. The method of claim 12 further including the step of admixing a thickener to promote slurry stability.

14. The method of claim 12 further including the step of admixing a coarser particle size pigment under agitation, said coarser particle size pigment having a median particle size diameter of $8.0\mu$ to $15.0\mu$.

15. The slurry of claim 5 wherein said slurry is used as a component of a water based paint formulation.

16. An aqueous coating formulation containing $TiO_2$ pigment wherein $TiO_2$ extension is obtained by incorporating the multi-component pigment slurry of claim 1 into the coating formulation.

* * * * *